F. W. RUSSELL.
POWER TRANSMISSION MECHANISM.
APPLICATION FILED MAR. 25, 1919.
1,364,584.
Patented Jan. 4, 1921.
2 SHEETS—SHEET 2.
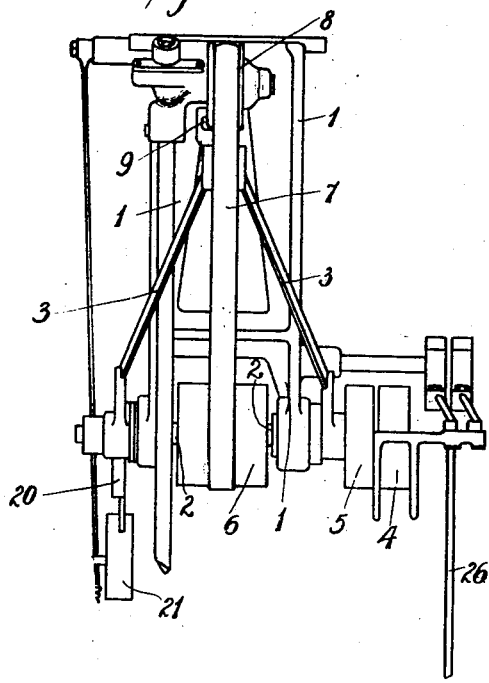
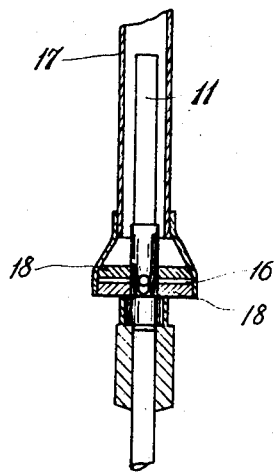
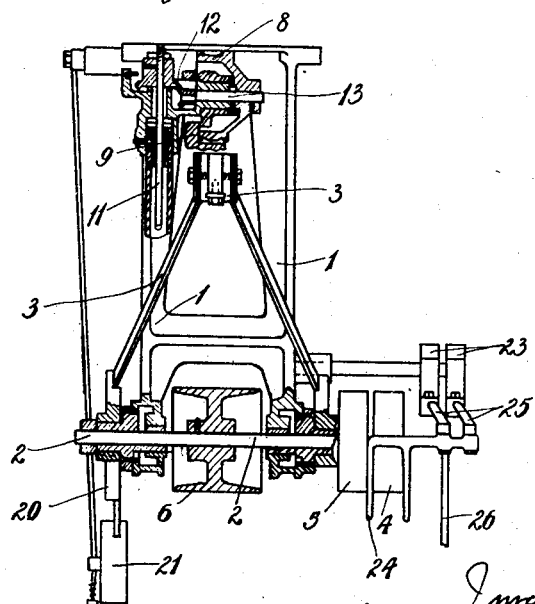

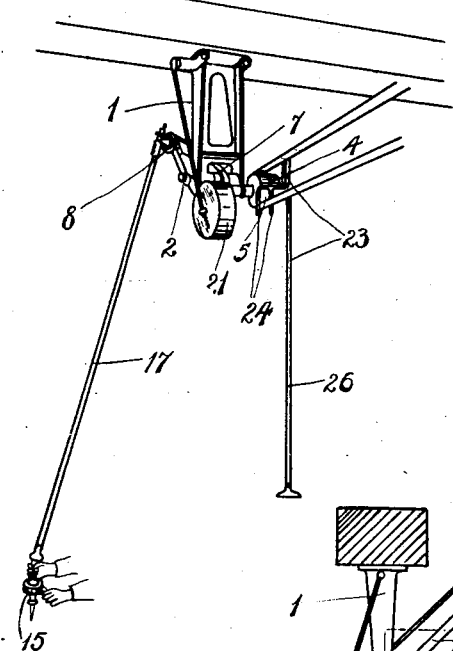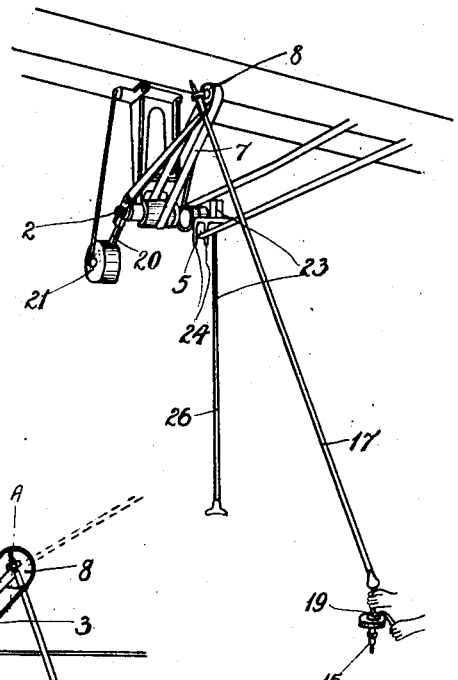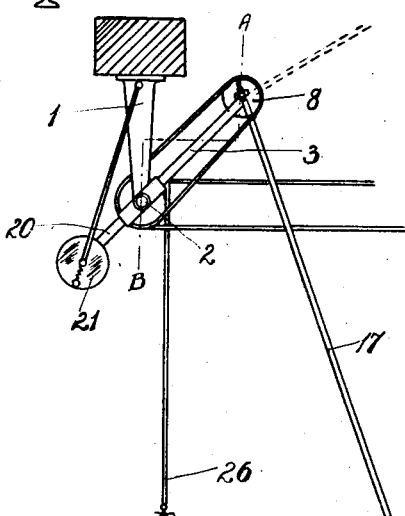

UNITED STATES PATENT OFFICE.

FREDERIC WILLIAM RUSSELL, OF REDDITCH, ENGLAND.

POWER-TRANSMISSION MECHANISM.

1,364,584.  Specification of Letters Patent.  Patented Jan. 4, 1921.

Application filed March 25, 1919. Serial No. 285,135.

*To all whom it may concern:*

Be it known that I, FREDERIC WILLIAM RUSSELL, a subject of the King of Great Britain, residing at 135 Hewell road, Redditch, in the county of Worcester, England, have invented a new and useful Power-Transmission Mechanism; and I do hereby declare the following to be a full, clear, and exact description of the same.

My invention comprises improvements in machines for inserting or extracting screws applicable also to other machines of a similar character including machines for grinding and boring operations, and refers to that class of such wherein a beam carrying driving mechanism is provided, transmission mechanism carried on the end of the said beam serving to operate a screw driver or other tool through the medium of a spindle pivotally mounted on the end of said beam.

The object of the present invention is to provide an improved machine and in accordance therewith it embodies a beam which carries primary and secondary driving pulleys, the beam being reversible to an opposite position by an angular movement about a horizontal axis, the free end of the beam carrying transmission mechanism which serves to operate a spindle carrying a screwdriver or other tool which is connected to the beam by a universal connection permitting it to be inverted or moved angularly in two planes.

Referring to the drawings:—

Figure 1. is a perspective view of a machine according to this invention.

Fig. 2. is a similar view showing the beam in another position.

Fig. 3. is a side elevation of same.

Fig. 4. is a front elevation to an enlarged scale.

Fig. 5. is a sectional view at A—B in Fig. 3 to an enlarged scale.

Fig. 6. is a sectional view showing the universal joint connection between the screw driver nozzle and driving spindle.

In carrying this invention into practice as illustrated upon the accompanying drawings the machine is carried by a bracket 1 which is mounted upon the ceiling or other structure, the lower end of the bracket 1 carrying a countershaft 2 which forms the axis about which the beam 3 is mounted in an angularly adjustable manner. The countershaft 2 carries fast and loose driving pulleys 4 and 5 whereby it is driven from the primary source of power, and also a third pulley 6 which through a suitable belt 7 drives another pulley 8 situated at the free end of the beam 3.

This latter pulley 8 is supported by a bracket 9 which is angularly adjustable about an axis parallel to the length of the beam 3 in such manner that the pulley 8 and spindle 11 hereinafter referred to can be moved angularly about this axis, the belt being slightly twisted in the operation.

The spindle 11 is connected to the pulley 8 through the medium of transmission gearing 12, so arranged that said spindle 11 may move angularly about the pulley axis 13 which is at right angles to the length of the beam 3. Thus the spindle 11 may be moved angularly in two planes at right angles to each other.

The screw driver proper or nozzle 15 is connected to the spindle 11 through the medium of a universal joint 16 while the spindle 11 is supported in a non-rotatable sleeve 17, the interior extremity of which is provided with a gimbal ring 18 so that the nozzle 15 has a universal joint connection with the driving spindle 11 and the stationary casting 19 of the nozzle 15 with the sleeve 17.

By these means the spindle 11 can be moved angularly from a truly vertical position so as to accommodate itself to varying positions of screws and may assume either a horizontal or even an upwardly inclined position, such as is indicated by the dotted lines in Fig. 3.

The beam 3 is provided with an extension 20 which carries a counter-weight 21 designed to balance the beam 3 and spindle 11 enabling the machine to be manipulated with a minimum of effort, the distance between the countershaft 2 and the top of its bracket 1 or ceiling being greater than the length of the extension 20 so as to leave room for the extension to pass when the beam is moved through an angle of 180° about the countershaft. The belt shifting gear 23 is so arranged that it would not be interfered with by the movement of the beam 3 and may conveniently comprise a shifting fork 24 carried by a pair of links 25 on the well-known parallel ruler principle and operated by a suitable lever 26.

It is to be understood that the term "pulley" as used in the specification and claims is intended to include a sprocket wheel or any other equivalent driving mechanism.

Although the machine is particularly applicable for use in extracting or inserting screws, it may also be employed for a variety of other purposes such as sand-papering, drilling or like operations.

What I claim then is:—

1. Power transmission mechanism comprising in combination a stationary forked bracket adapted to be secured to a stationary object, the forked end of said bracket providing two spaced bearings, a shaft journaled in said bearings, a forked beam pivotally mounted upon said shaft, said beam having bosses at its forked end which engage the shaft on the outer side of said bearings, an adjustable bracket carried by said beam, said adjustable bracket being angularly adjustable about an axis parallel to the length of the beam, a transmission spindle journaled in said adjustable bracket, a transmission pulley mounted on said spindle, a pulley mounted on said shaft between the forked ends of the stationary bracket, an endless flexible member mounted on said pulleys, a driven spindle, means for supporting said driven spindle at right angles to said transmission spindle, gearing on said transmission and driven spindles placing them in driving engagement, said supporting means and gearing permitting the driven shaft to make angular movement about the transmission spindle as a center.

2. Power transmission mechanism comprising in combination, a stationary forked bracket adapted to be secured to a stationary object, the forked end of said bracket providing two spaced bearings, a shaft journaled in said bearings, a forked beam pivotally mounted upon said shaft, said beam having bosses at its forked end which engage the shaft on the outer sides of said bearings, an adjustable bracket carried by said beam, said adjustable bracket being angularly adjustable about an axis parallel to the length of the beam, a transmission spindle journaled in said adjustable bracket, a transmission pulley mounted on said spindle, a pulley of greater width than said transmission pulley mounted on said shaft between the forked ends of the stationary bracket, an endless flexible member mounted on said pulleys, a driven spindle, means for supporting said driven spindle at right angles to said transmission spindle, gearing on said transmission and driven spindles placing them in driving engagement, said supporting means and gearing permitting the driven shaft to make angular movement about the transmission spindle as a center.

3. Power transmission mechanism comprising in combination, a stationary forked bracket adapted to be secured to a stationary object, the forked end of said bracket providing two spaced bearings, a shaft journaled in said bearings, a forked beam pivotally mounted upon said shaft, said beam having bosses at its forked end which engage the shaft on the outer sides of said bearings, an adjustable bracket carried by said beam, said adjustable bracket being angularly adjustable about an axis parallel to the length of the beam, a transmission spindle journaled in said adjustable bracket, a transmission pulley mounted on said spindle, a pulley mounted on said shaft between the forked ends of the stationary bracket, an endless flexible member mounted on said pulleys, a driven spindle, means for supporting said driven spindle at right angles to said transmission spindle, gearing on said transmission and driven spindles placing them in driving engagement, said supporting means and gearing permitting the driven shaft to make angular movement about the transmission spindle as a center, and a stationary sleeve disposed around said driven spindle and spaced apart therefrom, said sleeve being held at one end by the driven spindle supporting means and held at the other end by a gimbal ring forming part of a universal joint in the driven spindle.

4. Power transmission mechanism comprising in combination, a stationary forked bracket adapted to be secured to a stationary object, the forked end of said bracket providing two spaced bearings, a shaft journaled in said bearings, a forked beam pivotally mounted upon said shaft, said beam having bosses at its forked end which engage the shaft on the outer sides of said bearings, driving pulleys mounted on one end of said shaft, a counter-weight carried by the forked end of said beam which is remote from said driving pulleys, an adjustable bracket carried by said beam, said adjustable bracket being angularly adjustable about an axis parallel to the length of the beam, a transmission spindle journaled in said adjustable bracket, a transmission pulley mounted on said spindle, a pulley mounted on said shaft between the forked ends of the stationary bracket, an endless flexible member mounted on said pulleys, a driven spindle, means for supporting said driven spindle at right angles to said transmission spindle, gearing on said transmission and driven spindles placing them in driving engagement said supporting means and gearing permitting the driven shaft to make angular movement about the transmission spindle as a center.

FREDERIC WILLIAM RUSSELL.